April 3, 1956      A. J. STEARNS      2,740,249
CENTRIFUGALLY OPERATED ROTARY CUTTING ELEMENT
Filed Jan. 15, 1952
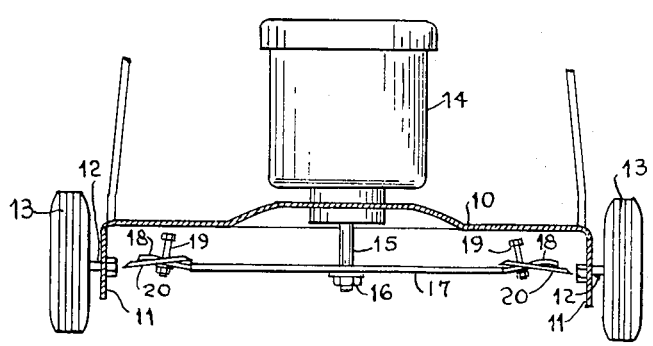
Fig. 1
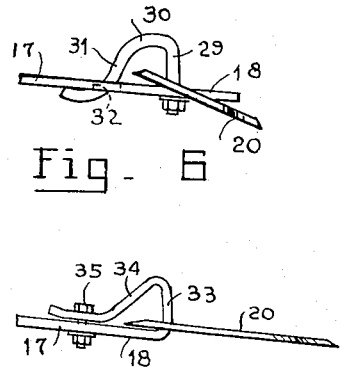
Fig. 6
Fig. 7
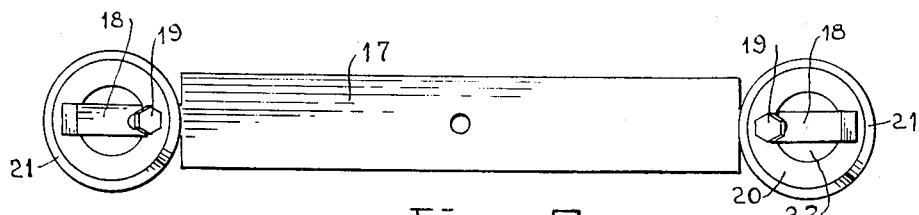
Fig. 2
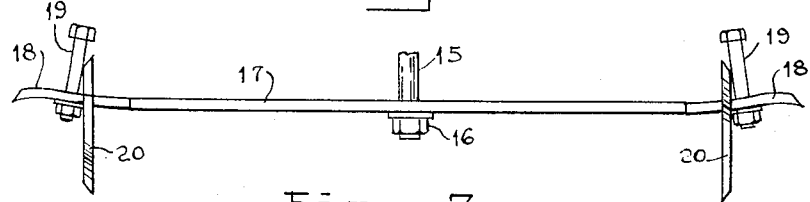
Fig. 3
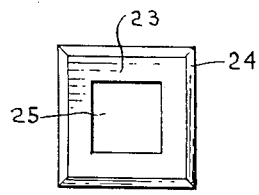
Fig. 4
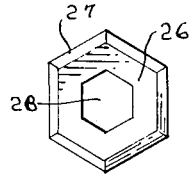
Fig. 5
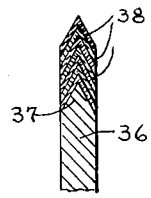
Fig. 8
A. J. Stearns INVENTOR.
BY Sand&Calhoun
Attorney

United States Patent Office 2,740,249
Patented Apr. 3, 1956

2,740,249

CENTRIFUGALLY OPERATED ROTARY CUTTING ELEMENT

Austin J. Stearns, Seffner, Fla.

Application January 15, 1952, Serial No. 266,513

1 Claim. (Cl. 56—295)

The present invention relates to a mower tip for rotary lawn mowers and it consists in the combinations, constructions and arrangements of parts herein described and claimed.

Generally there is provided a pair of mower blades which are carried at the outer ends of a rotary carrier bar and which normally lie in a vertical plane but which, upon rotation of the carrier bar, extend through centrifugal force to a substantially horizontal position and, since they rotate with the carrier bar, operate to cut a swath through grass, weeds and the like. Novel means is provided for mounting the movable blade and the blades are provided in several different forms in one case being provided with a plurality of removable blade edges of novel construction.

It is accordingly an object of the invention to provide novel removable and replaceable mower tip blades for a rotary lawn mower.

Another object of the invention is to provide a device of the character set forth which is simple in construction, inexpensive to manufacture and yet effective and efficient in use.

Another object of the invention is to provide, in a device of the character set forth, novel removable blade edges forming a part of the invention.

A further object of the invention is to provide, in a device of the character set forth, novel means for mounting centrifugally operated blades forming a part of the invention.

Other and further objects of the invention will become apparent from a reading of the following specification taken in conjunction with the drawing, in which:

Figure 1 is a front elevational view of an embodiment of the invention, a portion thereof being shown in section, Figure 2 is a fragmentary plan view, somewhat enlarged, of the device illustrated in Figure 1, Figure 3 is a front elevational view of the device illustrated in Figure 2 but showing certain centrifugally operated blades forming a part of the invention in non-operative position, Figures 4 and 5 are plan views of certain modified forms the movable blades may assume, Figures 6 and 7 are side elevational views illustrating certain novel mountings for centrifugally operated blades forming a part of the invention, and Figure 8 is an enlarged fragmentary sectional view illustrating certain removable blade elements forming a part of the invention.

Referring more particularly to the drawing, there is shown therein a conventional frame 10 having a pair of dependent portions 11 each carrying an outwardly extending axle 12 upon which is mounted a supporting wheel 13.

A motor 14 is mounted centrally upon the frame 10 and is provided with a vertically dependent shaft 15 to the lower end of which is affixed by nuts 16 or the like a horizontally extending carrier bar 17.

Each outer end of the carrier bar 17 is slightly upturned, as indicated at 18 and each of the portions 18 has centrally provided therein an upwardly extending stud 19. A circular blade 20 is provided with a sharpened outer periphery, as indicated at 21 and with a centrally disposed opening 22 through which extends the portion 18 of the carrier bar, the stud 19 being in each case mounted outwardly of the blade 20.

In operation, it will be apparent that the blades 20 normally lie in a vertical position as indicated in Figure 3 of the drawing but that when the shaft 15 is rotated, the carrier bar 17 will likewise be rotated thus causing the blades 20 to extend by centrifugal force to a more or less horizontal position, as shown in Figures 1 and 2 in which position the blade portion 21 of each of the blades 20 will come into contact with grass, weeds and the like to thereby cut the same. It will also be apparent that in use various portions of the peripheral edges of the blades 20 will from time to time come into contact with the grass, weeds and the like thus providing blade tips of extremely long useful age.

In Figures 4 and 5 there is respectively shown a square blade 23 having a square cutting edge 24 and a square opening 25 centrally disposed therein and, in Figure 5, a hexagonal blade 26 having a hexagonally shaped peripheral cutting edge 27 and a hexagonal opening 28 centrally disposed therethrough.

In the two forms of the invention shown in Figures 4 and 5, it will be apparent that various of the faces of the blades therein shown will be presented outwardly from time to time by merely turning the blades to present another face, the blades being turned upon the portions 18 with which they are supported. Thus it will be seen that a greatly prolonged life is imparted to blades of such structures.

In Figure 6 there is shown a different type of mounting for a blade tip as, for example, the blade 20 wherein a pin 29 is affixed to the portion 18 of the carrier bar 17 and extends thence upwardly to form one leg of a U-shaped member having a bight portion 30 and whose other leg 31 is elongated and extends through an opening 32. The blade 20 encircles the leg 29 and the portion 18 of the carrier bar and thus is free to normally depend in a vertical position as shown in Figure 3 or to extend substantially to a horizontal position as shown in Figure 6.

In Figure 7 there is shown still another form of blade mounting wherein the outer portion 18 of the carrier bar 17 is formed into a substantial U-shape with a bight portion 33 and an upper leg 34 which is bent toward the portion 18 and fastened thereto by means of a bolt 35 or the like thus providing a support for the blade 20 which normally encircles the portion 18 but which when the device is in operation encircles the bight portion 33.

In Figure 8 there is shown still another form the invention may assume wherein there is provided a circular blade 36 having a V-shaped cutting edge 37 in its outer peripheral edge upon which is sweated or otherwise mounted a plurality of removable blade faces 38.

In this form of the invention, it will be apparent that as the outermost face 38 is worn away through use, it will eventually break or may be otherwise removed from the assembly so that the next outermost blade face is then presented as a cutting edge and this process may be repeated until finally the edge 37 will be exposed. The edge 37 may then be used for a considerable length of time and may be sharpened in a normal manner.

The tips change automatically each time the mower stops as in Figure 3, the tips drop down when the mower is not operating, then when started, the ground, grass or stubble causes the tips to roll over to a new cutting position, with no attention from the operator.

While but certain forms of the invention have been shown and described herein, it will be readily apparent

What is claimed is:

A device comprising a vertical drive shaft, a horizontal carrier bar centrally mounted upon the lower end of said shaft, a blade tip loosely mounted upon each end of said carrier bar, means for normally supporting said blade tips in vertical condition, and means for supporting said blade tips in substantially horizontal condition when said carrier is rotated, said supporting means comprising a reduced portion at each end of said carrier bar, and a vertical upwardly extending stud affixed to each of said reduced portions.

References Cited in the file of this patent

UNITED STATES PATENTS

| | | |
|---|---|---|
| 1,439,581 | Sedberry | Dec. 19, 1922 |
| 2,071,872 | Cockburn | Feb. 23, 1937 |
| 2,143,068 | Hartshorn | Jan. 10, 1939 |
| 2,504,365 | Wallace | Apr. 18, 1950 |
| 2,538,230 | Boggs | Jan. 16, 1951 |
| 2,592,755 | Soenksen | Apr. 15, 1952 |